(12) United States Patent
Danielsen et al.

(10) Patent No.: US 7,813,518 B2
(45) Date of Patent: Oct. 12, 2010

(54) METHOD OF CURRENT MANAGEMENT IN A BATTERY POWERED AUDIO DEVICE

(75) Inventors: Finn Danielsen, Smørum (DK); Marinus Andersen, Smørum (DK)

(73) Assignee: Oticon A/S, Smorum (DK)

( * ) Notice: Subject to any disclaimer, the term of this patent is extended or adjusted under 35 U.S.C. 154(b) by 1181 days.

(21) Appl. No.: 11/436,619

(22) Filed: May 19, 2006

(65) Prior Publication Data

US 2006/0269082 A1    Nov. 30, 2006

(30) Foreign Application Priority Data

May 25, 2005    (EP) .................................. 05104490

(51) Int. Cl.
*H04R 25/00*    (2006.01)
(52) U.S. Cl. ....................... 381/323; 381/312
(58) Field of Classification Search .................. 607/55, 607/56, 57; 381/60, 106, 312, 314, 320, 381/321, 323
See application file for complete search history.

(56) References Cited

U.S. PATENT DOCUMENTS 5,838,807  A    11/1998   Andersson et al.
6,453,051  B1    9/2002   Killion

FOREIGN PATENT DOCUMENTS

WO    WO-2004/034073 A1    4/2004

*Primary Examiner*—Brian Ensey
(74) *Attorney, Agent, or Firm*—Birch, Stewart, Kolasch & Birch, LLP

(57) ABSTRACT

The invention relates to a method of current management in a battery powered audio device. According to the invention the method comprises the following steps:
  a—comparing the actual supply voltage from the battery with a fixed reference voltage,
  b—generating a control signal whenever the supply voltage is below the reference voltage,
  c—use the control signal to reduce the load current in the battery powered device, whereby the supply voltage from the battery will increase,
  d—repeat steps a, b and c whenever the supply voltage is below the reference voltage, and register the rate at which the sequence of steps are repeated, and
  e—activate an AGC to decrease the output level whenever repetition rate of the a, b and c steps is above a predetermined level.

8 Claims, 2 Drawing Sheets

METHOD OF CURRENT MANAGEMENT IN A BATTERY POWERED AUDIO DEVICE

AREA OF THE INVENTION

One of the characteristics of the batteries used in hearing aids is the relatively high internal impedance for this type of voltage source. Furthermore during the life time of the battery this impedance increases. To give an example for a 675 battery the internal impedance may for a fresh battery start at 1-2 Ohm (at 100 Hz) and increase to perhaps 10 Ohm at the end of the lifetime. Another and even worse problem is related to the most common battery type for hearing aids: Zinc-air batteries wherein one of the active ingredients for operation is oxygen from the air. The amount of air needed is dependent of the current supplied from the battery and if a certain current limit is exceeded the airflow through the inlets of the battery becomes insufficient and as a result the battery voltage starts to drop. To make it worse this current limit is not the same for different battery manufacturers and is also a function of time. Any audio device depending on battery power will have the above problem in more or less severe grade.

BACKGROUND OF THE INVENTION

For hearing aids especially within the power category the above weaknesses presents a major problem as the high sound levels produced by these hearing aids result in high current consumption from the battery. If the maximum current consumption from the hearing aid is being limited to a conservative magnitude in order to avoid problems with battery voltage drop, the maximum sound pressure level that the hearing aid can supply will be clearly below the needs for some of the hearing impaired. Increasing the maximum current on the other hand will lead to another problem: if the battery voltage is below a certain limit, the settings of the hearing aid can not be guarantied and this results in a reset of the digital control circuit during which the hearing aid is inoperative. In other words some type of control within the hearing aid is needed that will allow us to take advantage of the high current which zinc-air batteries can deliver, but on the other hand restricts the current demand from the hearing aid if the battery voltage starts to drop.

A prior art system is described in published WO application No. DK03/00636. The prior art battery management system (BMS) uses a voltage detector to monitor the battery voltage as shown in FIG. 1. If this voltage goes down to a predefined voltage (called bat. Low or $V_{reference}$), the detector forwards a control signal $V_{control}$. This signal is used to mute the output to the receiver which again will reduce the current drain from the battery thereby bringing the battery voltage up again combined with an un-mute of the signal. This scheme is repeated as many times as necessary in order to prevent the battery voltage from going down to the reset voltage of the hearing aid.

In the described prior art battery management system, advantage is taken of the class D amplifier used in the system. For a digital hearing aid with another type of output amplifier like a PCM amplifier this prior art scheme will not work due to audible side effects. According to the invention a system for battery management is provided, which can be used with a PCM amplifier without side effects detrimental to the sound quality.

SUMMARY OF THE INVENTION

According to the invention a method of current management in a battery powered audio device is provided whereby the method comprising the following steps:

a—comparing the actual supply voltage from the battery with a fixed reference voltage, b—generating a control signal whenever the supply voltage is below the reference voltage, c—use the control signal to reduce the load current in the battery powered device, whereby the supply voltage from the battery will increase, d—repeat steps a, b and c whenever the supply voltage is below the reference voltage, and register the rate at which the sequence of steps are repeated, and e—activate an AGC to decrease the output level whenever repetition rate of the a, b and c steps is above a predetermined level.

The c-step above is prone to audible side-effects, as the only way of securing fast reduction in the current consumption is temporarily disconnect the largest current consuming unit, namely the receiver. Such repeated muting of the receiver becomes audible after a short time as a metallic sound. The invention takes advantage of the fact, that the human hearing mechanism is unable to detect this metallic sound if the duration of the signal is in the order of some few milliseconds. According to the invention the sequence of actions a, b and c are carried out when the reference voltage is to low. If the sequence is carried out more than a predefined number of times within a given timeframe, an output reduction using an AGC system is activated. This will reduce the output level ex. by 1 dB and thereby lower the current consumption. If the sequence a, b and c is still active and its rate exceeds the limit, the output reduction by way of the AGC is increased and so forth until the battery voltage is above the battery low limit. The a, b and c sequence may cause an audible side effect, especially if it is carried out over prolonged time. This is avoided by the invention in that the AGC takes over the reduction in output and current consumption. When the output reduction is handled by the AGC it will not lead to the same kind of audible side effects, and it may happen less obtrusive for the user. The advantage of the invention is that the a, b an c sequence is very fast and reacts immediately to decreasing supply voltage, and before the a, b and c sequence becomes audible the AGC will take over and reduce the power consumption in a less obtrusive way.

The c-step above is usually a mute function, whereby the current supply to the receiver is temporarily cut off, but other ways securing a fast reduction in current consumption are possible.

According to the invention the AGC system is activated to return the sound level in increments to the starting point whenever the repetition rate of steps a, b and c has remained below a certain limit for a predetermined time after reduction of the sound level output. In this situation the detector changes it's control signal, and the AGC compressor settings will begin to return to normal again in small discrete steps. Compared to the attack situation—which will happen rapidly within a few milliseconds—this regeneration is considerably slower.

In a further embodiment of the invention a warning signal is provided for the user whenever the output power reduction caused by the AGC reaches a predetermined level, in order to signal that the battery has reached its end of life. Thus, the user has time to change the battery before the audio device is automatically turned off or before resetting of the audio signal processing is effected. This is especially advantageous when the device is a hearing aid. As an example, assume that the range of the AGC reduction is restricted to ex. 6 dB. If this reduction in MPO and current consumption is not enough —meaning that the mute system starts to become active above a certain limit—this indicates that the battery is approaching it's end of life and a beep sequence is emitted telling the user, that it is time to change the battery.

The invention may provide independent AGC systems in a number of channels. Preferably the invention is implemented in 8 channels. The advantage of having the system implemented in more channels is that the AGC's may act independently in the various channels. Thus larger steps of output reduction may be provided for some channels, typically for the low frequency channels.

DESCRIPTION OF A PREFERRED EMBODIMENT

Figure 1:
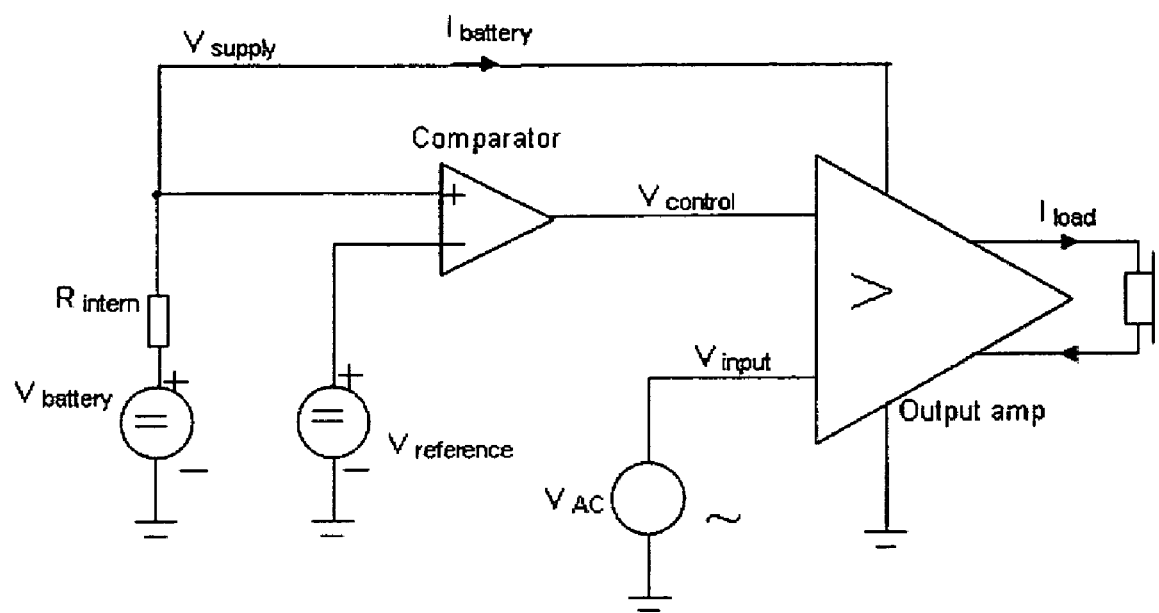
FIG. 1 is a system diagram of a prior art BMS.

The prior art system indicated by the diagram of FIG. 1 functions in the following way: the load current $I_{load}$ in the receiver is transformed to a current $I_{battery}$ taken from the battery. This current will generate a voltage loss due to the internal resistance $R_{intern}$ and/or due to lack of air within the battery. If the supply voltage $V_{supply}$ goes below a reference voltage $V_{reference}$, the comparator will now change its output state thereby generating a control signal $V_{control}$. This control signal $V_{control}$ is used to reduce the load current $I_{load}$ from the output amplifier—ex. by temporarily disconnecting the load or receiver—or muting the receiver, then current taken from the battery $I_{battery}$ will decrease and $V_{supply}$ will go up above $V_{reference}$. This in turn will change the output of the comparator and return the output amplifier to normal operation.

This sequence will be repeated as many times as necessary in order to prevent $V_{supply}$ to go far below $V_{reference}$.

Due to the repetition of the sequence, this system can be considered to be a sampled system. By the use of a fast comparator the repetition frequency can be very much higher than twice the highest audio frequency of interest and thereby any harmful side effects on the audio quality will remain small. This is the case for a class D output amplifier, but for other types of output amplifiers the system may give rise to audible side effect like a metallic ringing.

Figure 2:
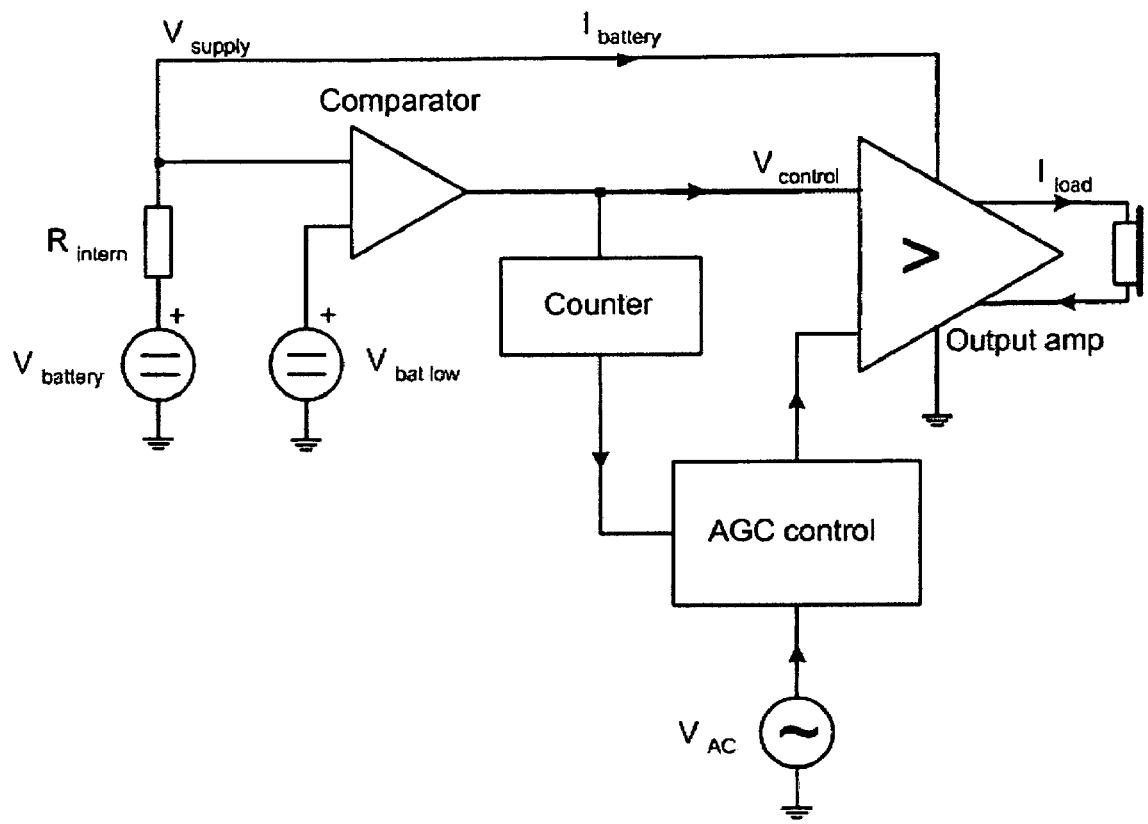
FIG. 2 shows a diagram of the system according to the invention.

According to the present invention, this is avoided by the use of an AGC system in combination with the above prior art system, such that the number of mutes experienced within a given time frame is kept below an upper limit. In FIG. 2 a system according to the invention is shown. This system comprises the same elements as the prior art system, but with the addition of the counter and the AGC. Here the Counter determines the rate of mutes. This may be done by counting the number of mutes in consecutive time frames. When the mute rate or number of mutes in a time frame exceeds a predetermined level, the AGC of each channel is activated to reduce the output level. This output level reduction will cause the current consumption to decrease, and possibly the battery voltage will start to rise. If the battery voltage remains low, further mutes will be generated, and if the mute rate again exceeds the predetermined level, a further control signal is generated to the AGC which will result in a further decrease in the output level.

If the AGC remains activated due to high mute rates for a longer time, and causing the AGC to reduce the output level by a predefined limit amount, this indicates that the battery has reached its end of life, and in this event a warning signal is provided for the user of the audible device. The limit amount could be 6 db.

If no new high mute rates are observed for a predetermined time, the AGC is instructed to increase the output level. This increase in output level has a long time constant where as the reaction to high mute rates is very fast.

The invention claimed is:

1. Method of current management in a battery powered audio device, the method comprising the following steps:
   a—comparing the actual supply voltage from the battery with a fixed reference voltage,
   b—generating a control signal whenever the supply voltage is below the reference voltage,
   c—use the control signal to reduce the load current in the battery powered device, whereby the supply voltage from the battery will increase,
   d—repeat steps a, b and c as long as the supply voltage is below the reference voltage, and register the rate at which the sequence of steps are repeated, and
   e—activate an AGC to decrease the output level whenever repetition rate of the a, b and c steps is above a predetermined level.

2. Method according to claim 1 wherein the AGC system is activated to increase the sound level in increments whenever the repetition rate of steps a, b and c has remained below a certain limit for a predetermined time after reduction of the sound level output.

3. Method as claimed in claim 1 or 2, wherein a warning signal is provided for the user whenever the output power reduction caused by the AGC reaches a predetermined level, in order to signal that the battery has reached its end of life.

4. Method as claimed in claim 1, wherein independent AGC systems are provided in a number of channels.

5. Method as claimed in claim 2, wherein the time constant for activation of the AGC due to observed high mute rate is small and where the time constant for returning the AGC to the starting point due to observed low mute rate is big.

6. Battery powered audio device with a battery which provides a supply voltage, a signal processing part and a receiver, whereby the signal processing device is adapted for generating a fixed reference voltage and where a comparator is provided for comparing the supply voltage with the reference voltage, and where means are provided for delivering a first control signal to the device whenever the supply voltage is below the reference voltage, and where the signal processing part has means for temporarily cutting the supply voltage to the receiver whenever a first control signal is generated, and whereby further a counter is provided which is adapted to count the number of first control signals within a given time frame and wherein the counter is adapted to deliver a second control signal to an AGC unit whenever the counted number of first control signals within a time frame exceeds a predefined number.

7. A battery powered audio device as claimed in claim 6, where the device is an output amplifier in a hearing aid, and where the comparing means are arranged to conduct the comparing at a repetition frequency, which is above the highest audio frequency of the hearing aid.

8. A battery powered audio device as claimed in claim 6, where the battery is a zinc-air battery.

* * * * *